July 31, 1962 A. R. HILBINGER 3,047,821

ISOLATOR USING HALL EFFECT GYRATOR

Filed Dec. 27, 1960

ALBERT R. HILBINGER
INVENTOR.

BY T. J. Holden and
D. M. Sandler
ATTORNEYS 3,047,821

ISOLATOR USING HALL EFFECT GYRATOR

Albert R. Hilbinger, Cockeysville, Md., assignor to Aircraft Armaments, Inc., Cockeysville, Md., a corporation of Maryland Filed Dec. 27, 1960, Ser. No. 78,647
2 Claims. (Cl. 333—24)

This invention relates to passive, electrical two ports which have unidirectional transmission characteristics, and more particularly to a two port network of the class described which utilizes a Hall effect gyrator.

A gyrator is a non-reciprocal network whose forward transfer impedance is the negative of its rearward transfer impedance. If a reciprocal network (one which obeys the reciprocity theorem and has forward and rearward transfer impedances that are equal) with a transfer impedance equal to the rearward transfer impedance of the gyrator is properly connected with the gyrator, the rearward transfer impedance of the series combination of the reciprocal network and gyrator becomes zero. In such case, the voltage at the output of the combination during transmission in the forward direction is a function of the current in both the input and output, but the voltage at the input of the combination during transmission in the rearward direction is independent of the current and voltage at the output. Such combination is a unidirectional transmission system, or more generally, an isolator.

In isolators of the class described, wherein the gyrator is a Hall effect device, there is actually a small loss in the forward direction in addition to a very large loss in the rearward direction. U.S. Patent No. 2,775,658 discloses an isolator utilizing a non-reciprocal network in the form of a Hall effect gyrator and a reciprocal network in the form of resistances shunting the input and output terminals of the gyrator. Such shunting resistances are disclosed to have the following value:

$$R_s=\frac{(R_{11})^2+(R_{21})^2}{2(R_H)}$$

where $R_{11}$ is the resistance between two input or two output terminals of the gyrator, and $R_H$ is the transfer resistance between the input and output terminals of the gyrator.

It is a primary object of this invention to simplify isolators of the class described by eliminating one of the shunting resistances without eliminating its function.

As a feature of this invention by which the primary object thereof is achieved, a single equivalent resistor shunted across the pair of input and output terminals of a Hall effect gyrator has been found to produce a highly efficient isolator. The value of such equivalent resistance has been found to be as follows:

$$(R_s)_e \doteq \frac{R_s}{3}$$

where $R_s$ is the value of the shunt resistances as disclosed in U.S. Patent No. 2,775,658.

The more important features of this invention have thus been outlined rather broadly in order that the detailed description thereof that follows may be better understood, and in order that the contribution of the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 1:
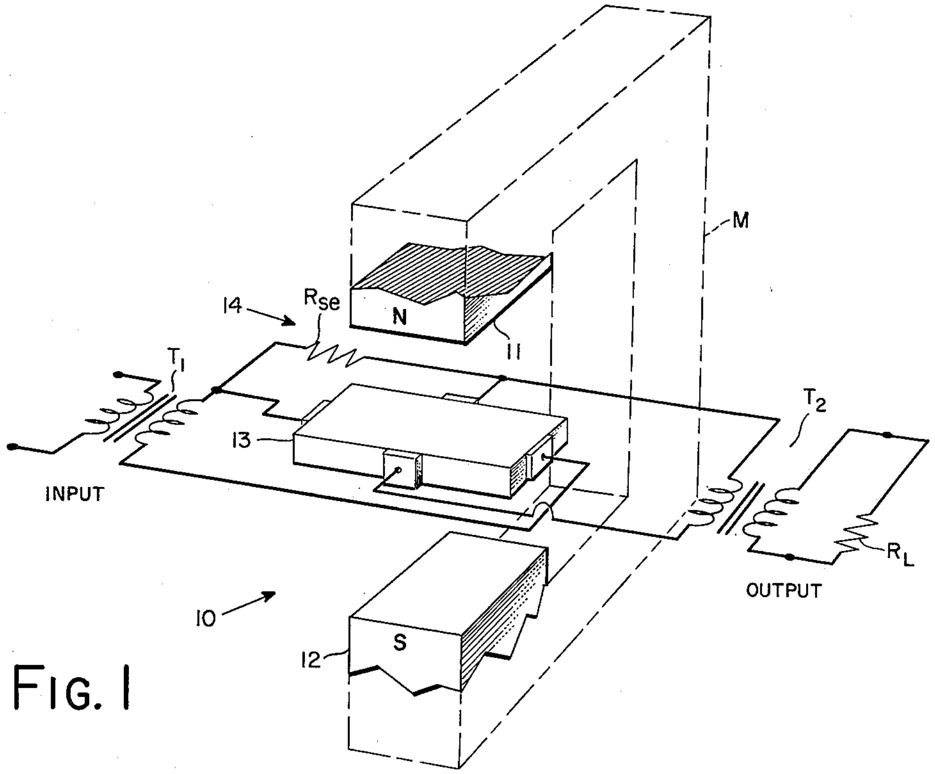
FIGURE 1 shows a Hall effect gyrator having a single shunt resistance which enables the device to operate as an isolator.

Referring now to FIGURE 1, an isolator made in accordance with this invention is shown generally at 10. Isolator 10 includes permanent magnet M having pole pieces 11 and 12 which serve to produce a unidirectional magnetic field in Hall effect element 13 which is positioned in air gap 14. The Hall effect element may be made of any conducting medium.

If $(R_s)_e$ in FIGURE 1 were infinite, element 13 would constitute a part of a Hall effect gyrator. It is known that the current and voltage are related as follows:

$$E_1=R_{11}I_1+R_HI_2$$
$$E_2=-R_HI_1+R_{22}I_2$$

where $E_1$ and $E_2$ are the input and output voltages, $I_1$ and $I_2$ are the input and output currents, $R_{11}$ and $R_{22}$ are the input and output self-impedances which are equal, and $R_H$ is the transfer impedance. The reversal of signs for the transfer impedance arises because there is a 180-degree phase shift in the current flow for transmission in one direction, and no phase shift for transmission in the opposite direction.

It is also known that the gyrator described above can be utilized as an isolator by shunting each input-output terminal pair of the gyrator with a resistance having the following value:

$$R_s=\frac{(R_{11})^2+(R_H)^2}{2(R_H)}$$

where the resistances are defined as above. However, it has been determined that two shunting resistors are unnecessary to utilize a Hall effect gyrator as an isolator. Only one effective resistor is necessary and can be connected across either pair of input and output terminals of the gyrator. The value of this effective resistor has been determined experimentally to be related approximately to the value of the pair of shunt resistors referred to above as follows:

$$(R_e)_s \doteq \frac{R_s}{3}=\frac{(R_{11})^2+(R_H)^2}{6(R_H)}$$

Figure 2:
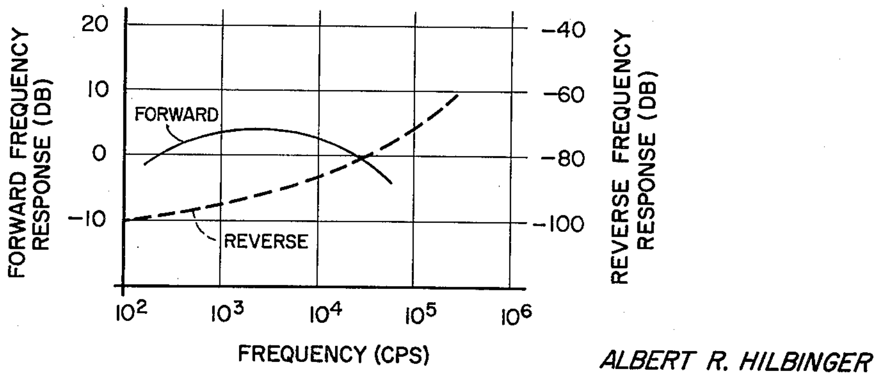
FIGURE 2 is a plot of the frequency response of an isolator constructed as shown in FIGURE 1.

Using the set up shown in FIGURE 1 with an Arnold Engineering Company type 9367 Alnico V C-magnet, a Siemens FA–24 InAs Hall element, a UTC DO–T14 and DO–T35 as tarnsfomers $T_1$ and $T_2$ and a load resistor of 6.8K ohms, the results shown in FIGURE 2 were obtained. The self impedance and transfer impedances of the Hall effect gyrator were measured and $(R_e)_s$ was calculated to be 0.42 ohm. A length of Cupron wire was used for the latter resistance. Air gap 14 was 0.090 inch. The voltage loss in the isolator excluding the transformers was about 6 db. The voltage gain in the forward direction shown in FIGURE 2 results from a voltage step-up in transformer $T_2$.

The shape of the forward frequency response is determined by the frequency response of the transformers. The difference between the forward and reverse response at a given frequency is a measure of the effectiveness of an isolator. From FIGURE 2, the isolation at 10 KC. is 85 DB. This corresponds to a voltage ratio of about 18,000 to 1. The use of a single effective shunt resistor as above described permits a Hall effect gyrator to be easily adapted for use as an isolator over a wide range of low frequencies.

What is claimed is:

1. An isolator comprising:

a Hall effect gyrator having a pair of input terminals and a pair of output terminals, and only one effective shunt resistance connected between said pair of input terminals and said pair of output terminals, said effective shunt resistance having substantially the following value:

$$(R_e)_s \doteq \frac{(R_{11})^2+(R_H)^2}{6(R_H)}$$

where $R_{11}$ is the input or output self resistance of the gyrator and $R_H$ is the forward transfer resistance of the gyrator.

2. An isolator consisting of:

(a) a Hall effect gyrator having a pair of input terminals and a pair of output terminals, (b) a single shunt resistance, (c) said resistance being connected between said pair of input terminals and said pair of output terminals, (d) said resistance having substantially the following value:

$$(R_e)_s \doteq \frac{(R_{11})^2+(R_H)^2}{6(R_H)}$$

where $R_{11}$ is the input or output self resistance of the gyrator and $R_H$ is the forward transfer resistance of the gyrator.

References Cited in the file of this patent

UNITED STATES PATENTS

| | | |
|---|---|---|
| 2,647,239 | Tellegen | July 28, 1953 |
| 2,775,658 | Mason et al. | Dec. 25, 1956 |
| 2,944,229 | De Vries | July 5, 1960 |

FOREIGN PATENTS

| | | |
|---|---|---|
| 1,196,139 | France | May 25, 1959 |

OTHER REFERENCES

Grubbs, Proceedings of the IRE, April 1959, pages 528–535.